UNITED STATES PATENT OFFICE.

CHARLES GRAEF, OF CLIFFORD, CANADA.

PROCESS OF MAKING CONCENTRATED APPLE-JUICE.

SPECIFICATION forming part of Letters Patent No. 640,289, dated January 2, 1900.

Application filed September 26, 1899. Serial No. 731,742. (No specimens.)

*To all whom it may concern:*

Be it known that I, CHARLES GRAEF, of the village of Clifford, in the county of Wellington, in the Province of Ontario, Canada, have invented a certain new and useful Improved Process for the Manufacture of a Syrup from Apple-Cider, of which the following is a specification.

My invention relates to an improved process for the manufacture of syrup from apple-cider; and the object of the invention is to produce a delicious, pure, and thoroughly wholesome syrup quickly and at a minimum cost; and it consists in the various steps hereinafter described.

The mode of practicing my invention is as follows: In my process I take ordinary fresh cider made from either sweet or sour apples, and to each gallon of such cider I add three-quarters of an ounce of bicarbonate of soda ($NaHCO_3$) and mix well. I let it stand for ten minutes and remove the scum, which arises to the surface of the liquid. I next introduce such liquid into what is termed a "jelly-evaporator," operated by live steam, and boil until the liquid reaches the temperature of 220° Fahrenheit. I then run it off into a cooling-vat and leave until cool, when I place it in a copper kettle and heat to a boil over a fire. When the scum again rises to the surface, I skim until clean. This portion is now ready for use and is set aside until the rest of the process is finished. I next take the ground apples from which the cider has already been expressed and put them into a vat and cover with water. It is necessary that such water be pure, and it is boiled and cooled again to a tepid temperature before being added to the apple-grounds. After having covered the apple-grounds with tepid water and such water has been absorbed by the grounds the mass is put into the press and a fresh quantity of a weaker apple-juice is expressed. This is now treated similarly to the cider hereinbefore referred to, with the exception that I utilize a smaller quantity of the neutralizer, about one-half ounce to the gallon of fluid being sufficient. I repeat this latter part of the process a second time upon the ground apples left, so that in all there are preferably three expressings from the one lot of apples. Both of these latter portions are then mixed with the first portion hereinbefore referred to.

In practice I find that where there are three bushels of ordinary apples to a barrel I can make about four gallons of apple-syrup of a richer, better, purer, and more wholesome quality than by using only the cider first expressed and treated as described. The quantity of syrup produced is considerably increased to the old method and is from one to one and a half gallons greater in quantity. Not only is the quantity greater, but the quality. It is also much cheaper, as the apple-grounds hitherto useless are made useful by macerating and expressing again. Of course I do not limit myself to the exact quantity of bicarbonate of soda to be used, as it depends upon the kind of cider and must vary to some extent; but the quantity necessary is readily apportioned with but little experience.

What I claim as my invention is—

1. The process herein described for producing syrup from apples consisting in first neutralizing the cider by the addition of bicarbonate of soda mixed therewith, then skimming the liquid, then evaporating or boiling, then cooling and next boiling again, and finally skimming the last-boiled liquid as and for the purpose specified.

2. The process herein described for producing syrup from apples arising in first neutralizing the cider by the addition of bicarbonate of soda mixed therewith, then skimming the liquid, then evaporating or boiling, then cooling, and next boiling again, then skimming the last-boiled liquid and finally mixing therewith one or more expressings from the apples previously expressed and treated in the same manner as the cider first expressed as and for the purpose specified.

CHARLES GRAEF.

Witnesses:
GEORGE M. BINNS,
WILLIAM GRAEF.